No. 704,023. Patented July 8, 1902.
C. E. FRITTS.
TELEGRAPH.
(Application filed Oct. 10, 1882.)
(No Model.)
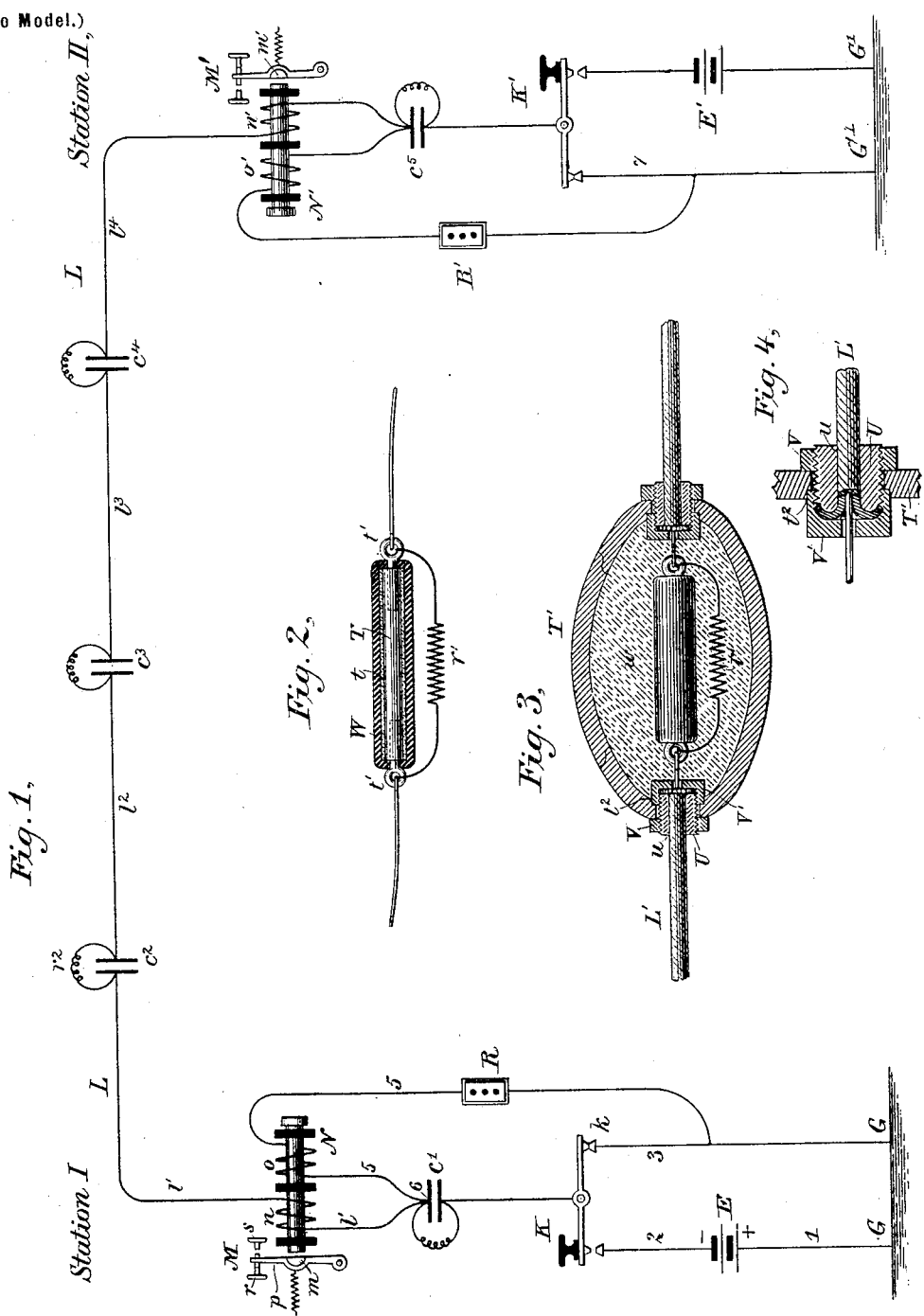
WITNESSES
Wm A Skinkle.
Geo W Breck.
INVENTOR
Charles E. Fritts.
By his Attorneys
Pohe Edgcomb & Buller

UNITED STATES PATENT OFFICE.

CHARLES E. FRITTS, OF NEW YORK, N. Y.

TELEGRAPH.

SPECIFICATION forming part of Letters Patent No. 704,023, dated July 8, 1902.

Original application filed April 2, 1881, Serial No. 29,882. Divided and this application filed October 10, 1882. Serial No. 73,903. (No model.)

*To all whom it may concern:*

Be it known that I, CHARLES EDGAR FRITTS, a citizen of the United States, residing in the city of New York, in the county and State of New York, have invented certain new and useful Improvements in the Construction and Arrangement of Telegraphic Conductors and Apparatus, of which the following is a specification.

This application is a division of my pending application, Serial No. 29,882.

My invention relates especially to the method and means for avoiding, preventing, or lessening the detrimental static charges and induced currents which invariably accompany the transmission of electric impulses upon telegraphic or telephonic lines or cables of considerable length or specific inductive capacity and which materially interfere with rapid and perfect signaling; and the object of my invention is to increase the practicable working capacity and length of such lines.

It is well known that static charge and retardation in an ordinary line or cable increase in the proportion of the square of its length—i. e., in a cable one hundred miles long the retardation would be one hundred times as great as in one ten miles long, and in one one thousand miles long it would be ten thousand times as great. To avoid this fault of ordinary lines, I dispense with the usual voltaic "current" in the line and its detrimental static induction, transmitting by the transfer of electrical charges over the line instead thereof, and constitute the line from a number of short sections inductively connected together in series, as by condensers, in such a manner that electrical impulses produced at one terminal of such composite line shall, in effect, be properly transmitted through the conductor to the remote terminal although the original current does not actually flow through the line and provide suitable means for recording or translating such impulses at the receiving-station. The transmitting-battery charges the nearest side of the condenser at its end of the line, and the other side is oppositely charged by induction therefrom. Charges of the same potentials are induced in the corresponding sides of the condenser at the farther end of that line-section, and so on to the last section and its condenser, and thus the battery charges every condenser in the line by consecutive inductions. From the tendency of the opposite ends of each section to take exactly opposite potentials by the neutral electricity of the section being separated into positive and negative electricities, which are driven to the two ends of the section by induction from the condenser, as is well understood, the varying potentials produced in the transmitting-condenser are repeated at each condenser through the entire line. As the signals or impulses sent over the sections are not ordinary voltaic currents flowing over the line, but are simply transfers of the static electric charges of the sections, the amount of energy required for effecting such transfers is very minute and would be practically but little more for fifty sections than for one—viz., that required to overcome the reaction of the electricity of the earth against the artifically-produced potential of the line at the end, which has to be overcome once whether the line consists of one section or many. The losses by transmission over a normal line of this kind are practically negligible, except those from the inductions at the condensers. By their proper construction, which is well understood, these losses can be made very small; and what is of far more importance is that any work or rate of speed which can be attained on any single one of these sections can also be attained upon a line composed of any reasonable number of such sections properly connected together, as herein described, provided the losses incurred at the great number of condensers do not collectively weaken the current too much to actuate the receiving apparatus at the end. The signals corresponding to the charges of different potentials produced at one end of the line are given off at the other end substantially unchanged, except in strength, as before explained, there being a different current on every section of the line. As the speed at which signals can be sent over such a line cannot exceed that practicable over that section of it which has the highest electrostatic capacity, it is desirable that the sections should have approximately equal electrostatic capacities, in order that the least number of sections may be required in a line of a given length. This normal section capacity can be found either by calculation or by direct experiment with a section of the same construction in the same general conditions to determine the greatest length and capacity which will admit of perfect working of the kind and speed desired in the given conditions and secure the certain and prompt control of its electric charge by the condensers at its ends. This capacity, after allowing a reasonable margin for contingencies, becomes the normal section capacity and determines the number of sections which should constitute the line. It is also evident that the line-condensers should likewise have approximately equal capacities, or at least that no one of them should be too small to properly receive and send on the impulses sent out by the transmitting condenser.

An existing line may be adapted by making the calculation in the inverse manner as follows: If a line or cable of the given length and construction has a transmitting capacity of two words per minute, by dividing it into two sections, properly connected, its capacity will be four times as many words; four sections sixteen times as many; ten sections one hundred times as many, and so on. I therefore divide the line up into sections until that length and capacity of section is reached which will admit of doing the work required over it. The former method of calculation may be applied in constructing a line, the latter in improving an already-constructed line to any desired capacity. The same principles govern the operation of constructing or adjusting the line to remove or prevent the inductive resistance arising from self-induction in the line or conductor itself or from other induced currents.

My invention therefore consists in avoiding, preventing, or lessening inductive resistance, such as static charge and retardation, by constructing or dividing the line into sections according to the principles before set forth and electrically connecting the terminals of the adjacent sections to the opposite terminals or armatures of suitable electrical inductive devices, which may be condensers or equivalent apparatus, whereby a composite and organized line is formed having the required length and properties.

It further consists in connecting the opposite plates of each of the condensers with each other through a conducting medium, which offers so great a resistance to electric currents of the strength employed for telegraphic and like purposes as to afford a sufficient length of time for the passage of a given impulse therethrough to allow that impulse when received at one plate of the condenser to be transmitted by induction to the opposite plate and to act upon the next succeeding condenser at the remote terminal of the succeeding section of the main line before the residue of said impulse or charge shall have traversed the artificial resistance and neutralized the opposing residual charge upon the opposite plate of the condenser. In other words, the resistance practically prevents any passage of the currents or impulses through it until they have acquired their full strength at the condenser (and done their work by induction through it) and then lets the opposite charges pass freely through it and neutralize each other therein, thus freeing the sections from charge immediately after the passage of the impulses and preventing discharge-currents being sent back over the sections. Such a line will be non-inductive.

My invention further embraces certain improvements in the construction of a connecting-condenser especially adapted for use as an inductive connection in a composite conductor of the character hereinbefore described and in the organization of the line or cable and the apparatus at the terminal stations, all as fully hereinafter set forth.

In the accompanying drawings, illustrating my invention, Figure 1 is a diagram showing the organization of the main line and the arrangement of the apparatus which may be used at the terminal stations in connection therewith. Fig. 2 is a detached view of one of the condenser connections, partly in section; and Figs. 3 and 4 show certain modifications in the construction of the same.

Referring to Fig. 1, L represents the main line, which is divided into sections $l'$ $l^2$ $l^3$, &c., preferably of such relative lengths that the electrostatic capacities of all the sections shall be approximately equal. Interposed between the adjacent terminals of each of these sections is placed a condenser, as shown at $c'$ $c^2$ $c^3$, &c., to the opposite plates of which are connected the corresponding terminals of the line-sections $l'$ $l^2$ $l^3$, &c. Although the sections are represented as being of nearly equal lengths they will not always be so in practice, the length being properly determined by the electrostatic capacity of the material or line. The greater this capacity per mile the shorter the sections should be, other things being equal. A short length of cable or underground wire may have as great electrostatic capacity as a long stretch of bare aerial wire, and to obtain the best results on my system such cable, when inserted in an air-line, should be connected in by inductive connections, as already explained, even when it is quite short. The actual length of the wire or cable in each section will therefore depend largely on its nature and construction and the purpose for which the line is intended, which will be well understood by those versed in the art.

A main line constructed in accordance with the principles of my invention may by proper adaptation be used in connection with any kind of transmitting and receiving apparatus and with any kind of current. As one example I have shown in Fig. 1 apparatus for sending and receiving the ordinary Morse signals, arranged for duplex (or quadruplex) working. As such signals are often of considerable duration, while a condenser gives off an impulse from one side only while the other side is being charged or discharged, (or while the current is increasing or decreasing in strength or changing in direction,) the capacity of the condenser should theoretically be such that it requires as much time to become fully charged as the longest single impulse which is to be sent continues, for if the capacity be too small it will become fully charged before the signal ends, and the signal will be shortened up or cut off at the receiver.

The apparatus at station II is or may be precisely similar to that at station I and will be referred to by the same reference-letters having the numeral "1" affixed. One plate or armature of the extreme condenser $c'$ of the line is connected with a key or other suitable transmitting device K, arranged to transmit electrical impulses to said condenser-plate from main battery E, one pole of which is connected by a wire 1 with the earth at G, and the other pole by a wire 2 with the working contact of the transmitting-key. When the key is in its normal position, it rests upon its back contact $k$, which is connected with the earth by a wire 3. A suitable receiving instrument M is included in the conductor $l'$, which unites the remaining plate of the condenser $c'$ with the adjacent plate of the next succeeding condenser $c^2$.

The receiving instrument which I prefer to employ is actuated by a differentially-wound electromagnet M of well-known construction, the opposing coils $n$ and $o$ of which are respectively included in the conductor $l'$, and an artificial conductor 5, which unites the upper or line plate of the condenser $c'$ with the earth and which includes an adjustable artificial resistance R. The electromagnet M is provided with a suitable armature $m$, carried upon an armature-lever $p$, which is shown as arranged to vibrate between two adjustable stops $r$ and $s$. The armature-lever may be employed as a relay for controlling the circuit connections of a local battery, or itself act as a sounder, and the receiver M may be any suitable form of magnetic receiving apparatus for telegraphic, telephonic, signaling, or other purposes.

The operation of the apparatus shown is as follows: When the key K is depressed, a current of a given polarity—for example, negative—is sent from the battery E to that plate or armature of the condenser $c'$ to which the key is connected. This current or impulse charges that plate of the condenser and induces in the opposing plate or armature an equal charge of the opposite polarity. The effect of the charging of the second plate is to cause an opposite charge to be acquired by the first plate or armature of the condenser $c^2$ at the opposite terminal of the line-section $l^2$, which unites the two plates. In like manner an electric charge is induced upon the opposing plate of the condenser $c^2$ by the charge of the first plate of that condenser, and the initial impulse will in this manner be transmitted through the entire line, reversing its polarity upon each condenser-plate until it reaches the remote station. The final effect is to send a charge to earth through the key K' and conductor 7. The effect of an impulse or electric charge thus induced upon the receiving instrument at station II is to magnetize the core of the electromagnet M' by traversing the coil $n'$. The armature $m'$ will therefore be attracted and the receiving instrument M' be actuated accordingly. It will be observed that owing to the circuit connections of the differential electromagnet of the receiving instrument an outgoing impulse—for example, from battery E at station I—will divide at the point 6 and traverse the coils $n$ and $o$ in opposite directions about the core of the electromagnet N. The result of this will be that the two parts of the divided impulse will neutralize each other, provided the resistance in the rheostat R is properly adjusted with reference to the main line, as well understood, and no effect will be produced by the electromagnet M upon its armature. An incoming impulse or charge, however, will traverse the coil $n$ of the electromagnet, which is that included in the line-section $l'$, and not being opposed by the coil $o$ it will actuate the armature and produce the proper signal. In case the condenser $c'$ is already charged from battery E by the operator at station I desiring to send a signal to station II, the incoming impulse after traversing coil $n$ will revert through the other coil $o$ of the receiving-magnet and will necessarily traverse this coil in the same direction as when passing through the coil $n$ and act upon the armature in the same way. In this manner I am enabled not only to neutralize the outgoing impulses and the inductive or charging currents in the receiving-magnet, but at the same time to more effectually utilize the energy of the incoming currents or impulses and to provide means for the duplex (as well as quadruplex or multiple) working of the line. It will be observed that when the operator raises his key the condenser $c'$ is connected to the earth by wire 3, and all of the condensers are discharged; but the discharge of the condenser $c^2$ through the coil $n$ does not actuate the receiving instrument N, because an equal impulse is sent from the earth through coil $o$ at the same time in the opposite direction, which neutralizes the effect of the discharge from $c^2$ and prevents any "kick" in the receiver. As the condenser $c^2$ received only one-half of the charge of the condenser $c'$, (the other half going to earth through the coil $o$,) the condenser $c'$ cannot be fully discharged until the latter half of its original charge has returned through the same path. It is therefore requisite that the transmitting-condensers $c'$ and $c^5$ should have double the capacity of those in the main line; otherwise only half of the capacity of the line-condensers would be utilized; but if the capacity of those condensers is adjusted to suit that of the line, as is usually done, the transmitting-condensers need not (in my system) have capacity equal to that of the entire main line, as is now necessary, but only double the capacity of the highest single section thereof, which enables me to use much smaller condensers than would be required by the systems now in use.

A way of making up for lack of capacity in the condensers is to increase the electromotive force of the battery employed, and thus increase the charge of the condensers to some extent. The shorter the sections of the line are the further it will be safe to go in this direction, as there is not the same danger to the insulation of the line as there would be if a single condenser had to force the impulses over the entire length of the line.

It will now be obvious that the electrostatic capacity of the artificial line need not equal or be adjusted to that of the main line, as is required in all previous systems in order to equalize the discharge through the coils of the receiving apparatus, &c.; but it is only necessary to adjust it to that of the particular section of the main line to which it is connected. This enables me to reduce the capacity and cost of the artificial line and facilitates the adjustment, inasmuch as I can, if desirable, constitute the main-line section $l'$ of a short bare wire, when its electrostatic capacity will be extremely small, and the artificial line may also be of the same construction. Where the main line is thus provided with special terminal sections, the adjustment of the relative electrostatic capacities of the two lines may generally be dispensed with; but the artificial resistance R must still be adjusted to the resistance of the main line in order to equalize the flow of current through the coils $n$ and $o$ of the receiving apparatus. This insertion into the main line of sections having abnormally low electrostatic capacity, whether at the ends or elsewhere, for special purposes does not in the least interfere with the proper working of my system, which only requires that the proper average or normal capacity found for the sections shall not be exceeded to any great extent by any individual section, since such excess would lower the charge given by the passing impulses to the condenser at the remote end of said section, and consequently of all the succeeding sections, and thus injure the efficiency of the entire line, whereas the abnormally low capacity of a section merely facilitates the passage of the impulses over it and the charging of the condenser at its end. It cannot, however, make up any losses caused by a preceding section of abnormally high electrostatic capacity, but can only convey such charge as it has received.

Although I prefer to use the apparatus connected in the line, as shown Fig. 1, the receiving apparatus need not be inserted in the line, but may be outside of the terminal or transmitting condenser. This arrangement will be shown by omitting the condenser $c'$ in Fig. 1, when the main line would commence at $c^2$; but in any arrangement of my system it is essential to get the terminal condenser of the line as near as possible to the battery—i. e., to have as little resistance and electrostatic capacity as possible in the conductor reaching from the battery-pole to that condenser. The best arrangement is to connect the battery-pole or the key directly to the condenser, as shown in Fig. 1, from K to $C'$ and from $K'$ to $C^5$. In this case an equating condenser should be inserted in wire 5, thus constituting the usual known arrangement at stations in connection with my main line.

I have said that the capacity of the condensers should preferably be such that they will only become fully charged during the time that any single impulse continues; but whenever the condensers in a line have not the capacity recommended a different kind of current may be employed, as hereinafter explained, or the same current may be used by means of a suitable receiving instrument therefor, such as the well-known polarized relay, which has a polarized armature playing between two magnetic poles instead of a soft-iron armature with a retracting-spring, as shown in Fig. 1. Its coils may, however, be differentially arranged, the same as shown in Fig. 1; but the static capacity of the sections $l'$ $l^4$ should be greater than that of the artificial lines. The armature will then be thrown into one position by the signal and will remain there even after that impulse ends until the transmitter raises his key, when the discharge from the condensers will throw the receiver-armature into the other position. Thus the Morse signals may be transmitted even when the capacity of the condensers is so small that the induced impulses transmitted by them are only of momentary duration.

Instead of utilizing the static discharge to actuate the armature in one direction a reversing-key or other well-known means of sending impulses of alternately-opposite polarity or direction over the line may be substituted for the key-and-battery arrangement shown in Fig. 1. In this case the capacities of the artificial line and the terminal main-line section are adjusted to equalize their action on the coils $n$ and $o$ as usual. My system is therefore better adapted for rapid signaling or rapid impulses than for long impulses and slow or hand signaling, which I have shown in the drawings to illustrate the principle of my invention. Among the systems for which it is specially suited are telephony and the multiple, automatic, and harmonic systems of telegraphy—in fine, all which employ currents of an undulatory character or consisting of rapidly reversed, interrupted, or recurring impulses. The transmitting and receiving apparatus will be such as are usually employed or suitable in each case and connected on either side or on both sides of the condensers $c'$ and $c^5$, as required. One such way of employing my system is to substitute in place of a continuous current a rapidly interrupted or alternating current produced in any suitable or well-known way and utilize the key K to transmit "blocks" or collections of such impulses instead of sending a single continuous impulse continuing during the same length of time as one "block" of alternating or intermittent impulses. The receiving apparatus should be adapted for the currents used and may be sluggish in action for the latter kind, while for alternating impulses the magnets should be arranged to operate either by the passage of impulses or by variations in their strength irrespective of their polarity or direction.

In case it is desirable to record each of the individual impulses and they are too rapid to be received by the ordinary electromagnetic receiving devices, the receiver may be any suitable electrochemical apparatus adapted for the purpose. The relative electrostatic capacities of the artificial line and the terminal section of the main line can be adjusted to utilize the static discharge in the receiving apparatus or not, as desired in each case, according to the method already explained, all of which will be readily understood by those versed in the art.

In constructing line wires or cables in which it is desired to have the sections $l'$ $l^2$ $l^3$, &c., of as great a length as possible the actual inductive capacity of the respective sections will be correspondingly great. I prefer under these conditions to unite the opposing armatures of each condenser by means of a resistance which is sufficient to permit an impulse or charge received upon one plate of the condenser to induce its corresponding impulse from the opposite plate and to produce the required effect upon the next succeeding condenser of the series before the shunt resistance falls and allows the opposite condenser charges to flow into the shunt resistance and neutralize each other therein. Thus if an electric impulse be received at the condenser $c^2$ the residual charge of the plate adjacent to the line-section $l'$ will traverse the resistance $r^2$ and neutralize the opposing residual charge upon the plate adjacent to the section $l^2$ nearly simultaneously with the transmission of the impulse through the next succeeding condenser $c^3$. In this manner the line will be freed from static charge immediately upon the transmission of each impulse, and the condensers are prevented from discharging back over the sections, as they otherwise would do. The charge is virtually wiped out at every division of the line. The utility of this arrangement is greatest when sharply-defined impulses are sent over the line, especially if they are somewhat slow or long, and least when the impulses have an undulatory or gradually-varying character, as in telephony. In the latter cases the resistance-shunts may be omitted. The shunt resistance is high while the arriving impulse is charging the condenser up to the proper potential and passing on to the next condenser and then becomes low while the condensers are discharging and allows the opposite condenser charges to flow freely into the shunt. The less this final resistance is the more quickly, readily, and completely will the opposite charges of the condenser meet and neutralize each other through it. The shunt resistance is therefore high enough at first to stop the signaling current or impulse from passing through it; but when the impulse has attained its full strength at the condenser and has charged both plates thereof it then becomes lower and will allow said charges to readily pass through it and neutralize each other in the shunt. In all previous arrangements of this kind the condensers have been employed to store up an electrical charge which at the proper time was to be discharged either over the line or through some instrument. My arrangement is exactly the reverse of this, and consists in shunting the condenser with a resistance which will practically prevent the passage of any current over the line through it while the condenser is being charged (and is transmitting the signals) and then serves to effect the neutralization therein of the opposite electrical charges, and thus prevents any discharge or return current being sent back through the line or instruments. If the capacity of the condenser is too small in this arrangement—i. e., the impulses are so long that they continue after the condenser is charged up to their potential—they will then pass freely through the shunt, as the inverse or opposing extra current then ceases and they have only the electrical resistance of the shunt to overcome. The condenser first sends on a sudden and sharply-defined impulse, which is then followed and kept up by the current flowing through the shunt, and this continues till the signal is ended, when the condenser sharply cuts it off by its sudden neutralization. This action of my invention may be utilized when it is desired to lengthen out the signals beyond the normal transmitting capacity of the condensers, so that its normal action could not give the desired results.

The form of condenser which I prefer to employ necessarily varies somewhat with the conditions to which it is to be subjected; but in principle of construction they are the same. Those for indoor use may be made in any suitable or well-known way. For aerial or overland lines I prefer to employ a condenser consisting of a thin sheet $t$, Fig. 2, of india-rubber or other suitable dielectric, faced upon each side with a sheet of tin-foil or a metallic film deposited by electrolysis or otherwise or attached to the sheets of dielectric in any suitable manner, the whole being rolled upon a central rod T of ebonite or any suitable non-conducting material. At the respective ends of the rod T are secured suitable metallic hooks $t'\ t'$, placed in electric connection with the respective armatures of the condenser and serving to make connection with the conductors forming the main line. Instead of the dielectric and the metallic films or plates being rolled around the rod as described they may be formed in long narrow sheets arranged in contact in the usual way, with the plates properly connected to the hooks $t'\ t'$ and the whole having the same general extended form as before stated. The complete structure is preferably incased in a watertight casing of suitable material and construction and may be inserted in a line-wire by simply connecting the respective terminals of the line-sections to the short lengths of conductor projecting outside of the casing and attached at their inner ends to the hooks $t'\ t'$. The whole may then be strung up in the open air as a constituent part of the line, as no strain is brought to bear upon the armatures themselves, and forms merely a small nearly cylindrical link in the line. It is also suitable for underground use.

For submarine cables I prefer to employ an inclosing case especially designed to sustain the tension brought upon it by the enormous weight of the cable with its metallic armor. Such a condenser is shown in Fig. 3. The construction of the armatures and dielectric is substantially the same as that shown and described in connection with Fig. 2. Instead, however, of relying upon the rod T for receiving the strain of the conductor I receive it upon the sheath T', made of gun-metal or other tenacious material and provided at each end with an opening, through which extends a centrally-perforated screw-plug U. The perforation $u$ through this plug is of sufficient size to receive the cable L'. Two nuts V and V' are fitted upon the opposite ends of the plug U, one of which, V, is constructed to bind against the outer surface of the casing T', while the remaining one, V', bears against the inner surface of the casing and preferably fits into a corresponding cavity formed therein. The nut V' is, moreover, provided with an inwardly-projecting flange, thus forming a cap for the end of the plug U. The cable end is passed through the perforation $u$, the armor of wires stripped from the end of the conductor L' and bent backward umbrella-like and fitted over the inner end of the plug U. The nut V' is then screwed down upon the ends of the armor-wires, binding them firmly to the plug. The cable end and plug being drawn through the opening in the case, the plug is secured in position by screwing the nut V down upon the casing. The end of the nut V' is thereby caused to press against the inner end of the casing and at the same time fits into the cavity $t^2$ and is thereby prevented from turning. The condenser being placed in the casing and the conductor L' being electrically connected with one of its armatures, it is effectually protected from any strain upon it or upon the conductor. Both ends of the casing being thus arranged, it is then closed and fastened and the whole safely sealed up. For the better protection against moisture the unoccupied space within the shell or casing T' may be filled with melted paraffin or other suitable substance, as shown at $w$. In Figs. 2 and 3 I have shown the condensers in connection with the artificial-resistance circuit $r'$. The construction of this resistance has already been described, and it may be inclosed within the shell or casing or not, as desired. The adjacent terminals of the main-line sections being properly spliced to the projecting ends of L' in the well-known manner of splicing or joining cables, the whole is ready to be sunk with the cable as a constituent part thereof.

I am aware that condensers have been used as connections between a submarine cable and the earth at its ends, and I expressly disclaim such uses, my invention relating to the employment of condensers as inductive connections to enable a line to be divided into sections for the purpose of avoiding, preventing, or lessening static charge and retardation in said line, according to the principles herein set forth, and thereby to obtain greater speed or perfection of working than would be practicable without my system.

I am also aware that resistance-coils have been used in shunts around condensers; but such use has been for the purpose of charging the condenser and causing it to discharge back into the line or through some apparatus to meet and neutralize return-currents coming from the line at the termination of the signals, and I do not claim such use. The object of my device is directly the reverse of that—viz., to stop the signaling impulses from passing through the resistance till they have acquired their full strength at the condenser, (the signals being meanwhile transmitted through the condenser,) then permit their passage freely to secure the neutralization of the opposite charges of the condenser, and so prevent them from being discharged back over the wire, as in all other systems.

I mean by "shunt resistance" any resistance or resistance coil or device which will operate as I have herein described when it is in shunt around the condenser.

By "condenser" I mean an electrical device which does not allow any actual passage of current over the line through it, but which receives from one direction or on one side electrical impulses or charges and produces and sends on like impulses from its other side without mechanism, but by simple electric induction alone.

By "main line" I mean the line extending between the transmitting and receiving stations, exclusive of the so-called "artificial line" and the local circuits used at the transmitting and receiving stations and to which the main line proper is connected, whether the latter be used for telephony or other branch of telegraphy or for other signaling or like purposes where electrostatic charges or other inductive resistances are troublesome.

By "non-inductive line or sections" I mean those which are free from the inductive resistances which are usually encountered in metallic circuits, especially those of any considerable length—such as static induction or charge, retardation, and self-induction in the line or conductor itself—which last is felt mostly in connection with alternating and similarly varying currents.

Any line or section which has been by my method made practically free from inductive resistances or sufficiently so to answer for the particular purpose or under the given conditions I call a "non-inductive line or section." They are made so by being arranged or adjusted in such a manner that no one of them shall exceed the standard or proper resistance suitable for the line, whether they were already short enough or were purposely shortened in inverse proportion to their inductive resistances. It is obvious that sections of cable with high inductive resistance would have to be much shorter than those of aerial wire if both were in the same line, and the greater the inductive resistances are on a given conductor the shorter must be the sections that are made from that conductor to bring them down approximately to the standard section resistance for that line. Such non-inductive sections when connected into a sectional line by the interposition between them of suitable condensers or equivalent devices, as hereinbefore explained, constitute a non-inductive line. When the condensers of such a line are in branch circuit or multiple arc with working apparatus or other resistances, the line is a non-inductive sectional line with shunted condensers, and when said resistances are of such a nature that they operate as hereinbefore described for my shunt resistances the arrangement is my "shunted non-inductive sectional line," or simply my non-inductive line. It will therefore be understood that no matter how great the inductive resistances may be with a given conductor or cable, we can cause the sections made therefrom to individually be "non-inductive" by simply making them short enough, and they should then be arranged according to the foregoing principles.

By "station" I mean any place where any one transmits or receives signals, &c.

As my invention utilizes cables, magnets, telegraphic and telephonic apparatus, condensers, &c., the construction, arrangement, and use of which are well understood and largely a matter of choice, any precise description thereof is unnecessary, and I have represented them by well-known conventional signs in delineating my invention, and it is to be understood that in whatever way my system may be applied the arrangement does or may include all the attachments, accessories, or arrangements which are usually employed or known to be advantageous in such or like cases by those versed in the art.

Having thus described my invention, what I claim as new, and desire to secure by Letters Patent, is—

1. An improved construction and arrangement of conductors and apparatus for telegraphic and like purposes, consisting in the combination substantially as hereinbefore set forth of a composite and organized main line composed of two or more non-inductive and non-retarding sections inductively connected together in series by condensers; water-tight casings, which protect said connecting devices from the tension of the line and are suitable for forming a constituent part of the line in the open air, earth or sea; one or more sets of transmitting apparatus at the terminal stations for producing electrical signals or impulses and thereby charging the terminal condensers of the line; and one or more sets of receiving apparatus at the ends of the line for recording or translating said signals or impulses.

2. A main line for telegraphic and like uses, made non-inductive for a given work or speed consisting of sections having electrostatic capacities between stations which will individually permit of such working or speed, and inductive devices uniting them into a line which has the same special fitness or properties as its sections, substantially as set forth.

3. A main line for telegraphic and like uses, consisting of the combination of a wire or cable divided between two stations into two or more sections, condensers inductively connecting the sections in series, and means for protecting said condensers and connections from injury by strain, water or weather.

4. A main line for telegraphic and like uses, consisting of sections whose electrostatic capacities by the rules herein set forth come below or within a capacity fixed upon as a maximum allowable in the given conditions, and condensers inductively uniting the sections together in series, substantially as set forth.

5. A composite and organized main line for telegraphic and like uses, consisting of the combination of two or more non-inductive and non-retarding sections of suitable conductor or cable; inductive devices connecting said sections in series and adapted to transmit signals or impulses from one section to and over the next one, in either direction, without mechanism or moving parts but by induction alone; means for protecting said devices from the tension of the line; and suitable water-tight casings or coverings when required for protecting the inductive devices and their connections and adapted to be used in the open air, earth or sea as a constituent part of the line.

6. The combination of a main line connecting two stations and consisting of sections connected by condensers, and an artificial line connected thereto at one of the stations and having an electrostatic capacity equal to that of the terminal section of the main line to which it is connected, instead of being adjusted to the whole of the main line as is usually done.

7. In a sectional main line, the combination of two or more sections approximately equal in inductive resistances, such resistances being not greater than is consistent with the work and speed required on the line; and condensers inductively connecting said sections in series and also being approximately equal in capacity.

8. A circuit for variable currents, having the sections adjusted to enable the desired current to flow over the line by the interposition of condensers suited to the electrical resistances in the sections.

9. An electric circuit divided into sections, and having the sections adjusted to enable the selected or predetermined current to flow over the line by the interposition between the sections of condensers suited to the number of them in the series or line.

10. A non-inductive sectional line consisting of the combination of sections of approximately equal electrical and inductive resistances, connected by the interposition of approximately equal condensers or equivalent devices.

11. The combination of two terminal stations with transmitting and receiving apparatus; a circuit or line connecting said stations, consisting of practically non-inductive sections; and condensers or equivalent devices interposed between them, whose capacities are approximately equal, and proportionate to the number of them connected in the series or line.

12. The combination of a main line between stations consisting of sections free from inductive resistance inductively connected in series by condensers; suitable transmitting apparatus at the terminal station or stations; and a transmitting-condenser connecting said apparatus to the main line and having double the capacity of the condensers in the main line.

13. The combination of a practically non-inductive sectional main line between stations; suitable transmitting apparatus at the terminal station or stations; and a transmitting-condenser connecting said apparatus to the main line, having double the capacity of the condensers in the line, one pole of the battery or generator being connected directly to said condenser with a very low resistance between them.

14. The combination of transmitting apparatus; a main line between stations which, for the purpose of avoiding, preventing or lessening static charge and retardation, is constructed from two or more sections without inductive resistances inductively connected in series by condensers; and a condenser connecting said transmitting apparatus to one end of the line and forming the connection between said line and the local circuit at the transmitting-station.

15. The combination of a sectional main line between stations; suitable transmitting and receiving apparatus at the terminal stations; condensers inductively connecting said apparatus and the main line; and artificial lines at each station, whose resistances are adjusted to those of the particular sections or circuits to which they are connected.

16. The combination, substantially as hereinbefore set forth, of a main-line conductor divided between stations into sections without inductive resistance by the interposition of condensers between said sections; and a differential electromagnet having one of its coils included in one section of said main line between two condensers, and its remaining coil in the circuit of a conductor extending from the adjacent plate of one of said condensers and forming an artificial line uniting the terminals of said condenser, whereby an electric current traversing the first-mentioned coil to the condenser and reverting through the second coil will in each case produce a like magnetic effect upon the core of said electromagnet.

17. The combination of a sectional main line between stations which is divided into sections by the interposition of condensers between said sections; an artificial line whose electrostatic capacity is equal to that of the main-line section to which it is connected; and a differential receiving instrument one coil or part of which is in the main line and the other coil in the artificial line.

18. The combination of a sectional main line which is divided into sections by the interposition of condensers between said sections; means for producing alternating electrical signals or impulses; a condenser connecting said means to one end of the line; suitable receiving apparatus, adapted to respond to incoming but not to outgoing currents, at the other end of the line; and a condenser at said end connecting it to a grounded wire or circuit.

19. The combination of a circuit divided into practically non-inductive sections disposed in inductive relation and in series; sections approximately equal in inductive and electrical resistances; and condensers interposed between said sections which are suitable for the resistances in the sections and the number of them connected in the series or circuit.

20. The combination of a non-inductive line consisting of sections connected by condensers, as described; generating apparatus sending to said line currents or impulses which charge and discharge the condensers in equal ratios; and condensers having electrostatic capacities capable of receiving and storing as charges the longest impulses or signals sent over the line.

21. The combination of sections made short enough to have the desired freedom from electrical and inductive resistances; condensers or equivalent devices connecting the sections in series and having capacities proportionate to the resistances in the sections and the number of them in the series or line.

22. In a sectional main line, an inductive connection between the sections consisting of the combination substantially as described of a condenser of suitable construction and capacity inserted directly in the line, means for protecting the condensers from exposure and from strain from the tension of the line, and means for electrically connecting the sections with the armatures of the condenser, the whole adapted to be used in the open air, earth or sea, as a part of the line.

23. In a sectional line, an inductive connection between the sections consisting of the combination of condenser-plates insulated from each other by dielectrics and rolled upon a non-conducting rod, and means for sustaining the strain of the conductors from the opposite extremities of said rod and electrically connecting the same with the respective plates.

24. In a non-inductive line in which sections made from cables and line of high electrostatic capacity may be connected with sections of bare wire or conductor of low electrostatic capacity, the combination of sections of different characters or kinds but adjusted to have approximately equal electrostatic capacities, with condensers or equivalent devices having approximately equal capacities, as inductive connections between the sections.

25. The combination of a cable or electric line or circuit divided into sections free from inductive resistance; a device for transmitting electrical impulses by electrical induction from one section to and over the adjacent one, in both directions, interposed between the sections and having each section electrically connected with one side of said device; means for securing the cable or line and preventing any strain upon the connections of the conductor to said device; and a suitable water-tight casing inclosing the same.

26. In a sectional line, an inductive connection for uniting the terminals of the adjacent sections consisting of the combination of a dielectric composed of thin sheets of india-rubber or other suitable insulating material; conducting plates or armatures arranged between said sheets; means for attaching the terminals of the sections to the opposite armatures or plates without subjecting them to strain or tension from the line; and a water-tight casing inclosing the same, adapted to be used in the open air, earth or sea and to form a constituent part of the line itself between stations.

27. The combination of a plurality of non-inductive sections such as described, arranged in series as a discontinuous line; and condensers or equivalent devices connecting said sections into a line, and transmitting the line-currents through them, to and over the adjacent sections in both directions, without mechanism or moving parts, but by induction only.

28. The combination of a line consisting of sections inductively connected by condensers; shunts around the condensers; and resistances in said shunts which are high enough to stop the passage of signals or impulses through the shunts, and cause them to charge the condensers and be transmitted by them over the line.

29. In a line consisting of sections inductively connected by condensers, the combination of a condenser; a shunt around the condenser; and a resistance in said shunt, having no movable parts and performing no other function in the line, the whole arranged and operating to send the signals or impulses through the condenser and to prevent any currents passing through the resistance till they acquire their full strength at the condenser, and to then let the opposite charges thereof pass freely through the resistance and neutralize each other immediately therein.

30. In a line consisting of sections inductively connected in series by condensers, the combination of a condenser; a shunt around said condenser; a discharging resistance in the shunt approximately equal to the resistance of the adjacent sections of the line.

31. In a sectional line, the combination of a condenser; a shunt connecting the opposite terminals or armatures of the condenser; and a charging resistance in said shunt which is sufficiently high to practically prevent the signals or impulses from passing through it till they have acquired their full strength at the condenser, and sufficiently low in electrical resistance to then allow the opposite charges to pass freely through it and neutralize each other.

32. In a sectional line, the combination of a condenser; a shunt around the condenser; a discharging resistance in said shunt, adjusted to regulate the speed and perfection of the neutralization of the opposite charges of the condenser through it, substantially as set forth.

33. The combination substantially as set forth of a main-line conductor divided between stations into sections; a condenser inductively uniting the adjacent terminals of said sections; a conductor uniting the opposite terminal plates of the condenser; a suitable resistance in said shunt-conductor; and a water-tight casing or covering for protecting the condenser, resistance and connections, and adapted to be used as a part of the line in the open air, earth or sea, between stations.

34. In a composite and organized main line for telegraphic and like uses, the combination of terminal sections containing transmitting and receiving apparatus; interior non-inductive sections substantially alike and having no such apparatus; and condensers inductively uniting said sections in series; substantially as and for the purposes set forth.

35. In a composite and organized main line for telegraphic and like uses, the combination of terminal sections containing transmitting and receiving apparatus; interior sections having no such apparatus; condensers inductively connecting said sections in series; a conductor connecting the opposite armatures of the terminal condensers; and a suitable shunt resistance in each of said conductors, all substantially as and for the purposes set forth.

36. In a sectional line such as described, the combination of a non-inductive standard or normal section, that is to say, one in which static induction and retardation are substantially removed and prevented, thus adapting it for the required speed of transmission over the line; one or more other sections whose electrostatic capacities are approximately equal to that of the standard section, that is to say, the same or lower; condensers inductively connecting said sections in series and adapted to be used in the open air, earth or sea, as a part of the line between stations.

37. In a sectional line such as described, the combination of a standard non-inductive section, that is to say, one which has been altered and shortened till static induction and retardation are removed and thus adapted for the required speed of transmission over it; one or more other sections whose electrostatic capacities are less than that of the standard section; terminal sections containing transmitting and receiving apparatus; and condensers inductively uniting said sections in series, substantially as and for the purposes set forth.

38. A non-inductive line, consisting of the combination of a line or cable divided into sections which will be practically free from inductive resistances in the proposed conditions; a sufficient number of sections having such proper lengths and properties arranged in inductive relation and in series; and suitable condensers connecting the adjacent ends of said sections into a line.

39. The combination of a condenser between two sections of a sectional line; a conductor connecting the two sides of said condenser; and suitable shunt resistance in said conductor, as set forth.

40. The combination of a sectional line consisting of non-inductive sections connected in series by condensers; a transmitting-condenser connected to the end of said line; and a transmitting or charging generator therefor, having its pole connected directly to the transmitting-condenser.

41. In a sectional line, the combination of non-inductive sections or conductors, and condensers connecting them in series, with capacities proportional to the predetermined line-current.

42. A sectional line consisting of the combination of sections or conductors; condensers connecting them in series; and total resistance in each section conforming to the standard section resistance of the line.

43. In a sectional line, the combination of standardized sections connected in series by standardized condensers, as set forth.

44. A line consisting of two or more conductors or sections connected in series by condensers, each of the sections having its resistances, capacities and electromotive forces coördinated or proportioned to conform to a predetermined section standard, whereby the selected line-current can be transmitted successively over all of the sections.

45. The combination of a line or conductor divided into practically non-inductive sections; and condensers or equivalent devices between the adjacent terminals of the sections; and acting as inductive connections, which transmit electrical impulses through them by electric induction from each section to and over the adjacent sections in both directions.

46. The combination of a line or conductor divided into practically non-inductive sections; condensers or equivalent devices between the adjacent terminals of the sections, acting as inductive connections between them; conductors connecting the opposite poles or armatures of one or more of said condensers; and suitable resistances in said shunts which are high enough to prevent the passage of any current through them till the condensers are fully charged and ready to discharge, and which are then low enough to permit the opposite condenser charges to flow freely through them and neutralize each other therein—whereby discharge or return currents are prevented from flowing back over the line.

47. The combination of a main-line conductor divided into two or more non-inductive sections as described; and a series of condensers or equivalent devices inductively uniting the adjacent terminals of said sections.

48. The combination of a main-line conductor divided into two or more non-inductive sections such as described, and having approximately equal inductive capacities, or at least none of them exceeding the standard or proper section capacity for that line; and condensers or equivalent devices inductively connecting the adjacent terminals of said sections.

49. The combination of sections made short enough to be practically equal in freedom from inductive resistances, and without any earth connections between the terminal stations while operating; and suitable condensers or equivalent devices connecting said sections into a line, substantially as set forth.

50. The combination of sections made short enough to be practically equal and free from inductive resistances, and without any earth connections between the terminal stations while operating; suitable condensers or equivalent devices connecting said sections into a line; shunts around said condensers; containing suitable resistances such as described, but having no other branch circuits nor resistances in shunt with said condensers.

51. The combination of a line divided into practically non-inductive sections approximately equal in length, or at least in electrical and inductive resistances; and connected in series by the interposition at periodically-recurring points of condensers or equivalent devices, which receive impulses or signals on one side, and by electrical induction through them send equivalent impulses or signals from their other sides, to and over the adjacent sections in both directions.

52. The combination of a line divided into practically non-inductive sections approximately equal in electrical and inductive resistances, or at least none of the sections much exceed the standard or proper amount of section resistance for that line; connected in series by condensers or equivalent devices which receive and transmit currents through them by electrical induction, to and over the adjacent sections in both directions.

In testimony whereof I have hereunto subscribed my name this 3d day of October, A. D. 1882.

CHAS. E. FRITTS.

Witnesses:
   DANIEL W. EDGECOMB,
   CHARLES A. TERRY.